United States Patent [19]

Appley

[11] 4,228,865
[45] Oct. 21, 1980

[54] VEHICLE CONTROL SYSTEM FOR THE HANDICAPPED

[76] Inventor: Robert J. Appley, 902 Birch Ave., Shelby, Mont. 59474

[21] Appl. No.: 931,613

[22] Filed: Aug. 7, 1978

Related U.S. Application Data

[62] Division of Ser. No. 794,822, May 9, 1977, Pat. No. 4,143,281.

[51] Int. Cl.³ .................. B60K 26/00; B60K 41/20
[52] U.S. Cl. ................................ 180/333; 74/471 R; 74/478
[58] Field of Search .................. 180/77 H, 77 HT; 74/471 R, 471 XY, 478

[56] References Cited

U.S. PATENT DOCUMENTS

| | | | |
|---|---|---|---|
| 2,176,170 | 10/1939 | Flowers | 180/77 H |
| 3,063,526 | 11/1962 | Griffen | 74/478 X |
| 3,117,649 | 1/1964 | Parton | 180/77 H |
| 3,275,093 | 9/1966 | Pawl | 74/471 X |

FOREIGN PATENT DOCUMENTS 1019253  1/1953  France .................... 180/77 H

*Primary Examiner*—John P. Silverstrim
*Attorney, Agent, or Firm*—Arthur L. Urban

[57] ABSTRACT

The vehicle including a dual function hand operated control system including a lever affixed to a rotatable shaft, two spaced arms extending generally upwardly from the shaft forward of the lever, one the arms being pivotally connected to a substantially vertical push rod which extends downwardly into a substantially vertical sleeve, the lower end of the sleeve being operatively connected to a power brake booster through pivotally connecting linkage, and the second arm being operatively connected to a throttle cable extending from the dash through flexible connecting means.

4 Claims, 2 Drawing Figures

VEHICLE CONTROL SYSTEM FOR THE HANDICAPPED

This a division of application Ser. No. 794,822, filed May 9, 1977, now U.S. Pat. No. 4,143,281.

This invention relates to a vehicle capable of being operated by a physically handicapped person and more particularly relates to a vehicle providing independent transportation capability for a wheel chair bound individual.

A major effort is underway in the United States to reduce the logistic problems of physically handicapped persons. For example, new buildings are being built with wider doors and ramps to accommodate wheel chairs, and existing buildings are remodeled to provide such facilities. Buses are now being offered with lifts for wheel chairs. Also, cities are replacing curbs at intersections with ramps to simplify movement of wheel chairs from the street to the sidewalk.

However, one area in which little has been done is that of vehicles for physically handicapped individuals. The handicapped have had to arrange personally for the modification of conventional vehicles to enable them to drive. These modifications usually are makeshift in nature and often marginally acceptable. For example, a lift may be added on the side or back of a van, but such lifts are not convenient to operate and occupy considerable space. Also, hand operated extensions can be added to the brake and throttle pedals to permit operation of a vehicle without the use of the feet. These extensions often are cumbersome to operate and require considerable dexterity.

A further problem is the safety of a wheel chair bound driver which the vehicle in the event of an accident. It has been proposed to use safety belts and harnesses on the wheel chair and the occupant, but this is not acceptable since wheel chairs are not designed to take the forces imposed by the forward movement of a human body in case of a front end collision. The use of belts and harnesses around the chair and driver also is not desirable since in a rollover the weight of the chair may be added to the driver's weight that is bearing against the belts, thereby making release of the belts practically impossible. Another objection to the use of belts is the difficulties some physically handicapped persons have in manipulating and latching such devices.

Thus, it is apparent that simple solutions to the problems of entry and exit, driver operating controls and occupant safety are not available to wheel chair bound drivers who desire independent transportation capability.

Further, the novel vehicle of the invention provides a unique hand control system in which a single lever controls both the brake and throttle functions. Moreover, the single hand control can be operated by individuals lacking normal hand and/or arm dexterity. The hand control also utilizes body momentum to facilitate application of the brake for additional safety.

Other benefits and advantages of the present invention will be apparent from the following description and the accompanying drawings in which.

Figure 1:
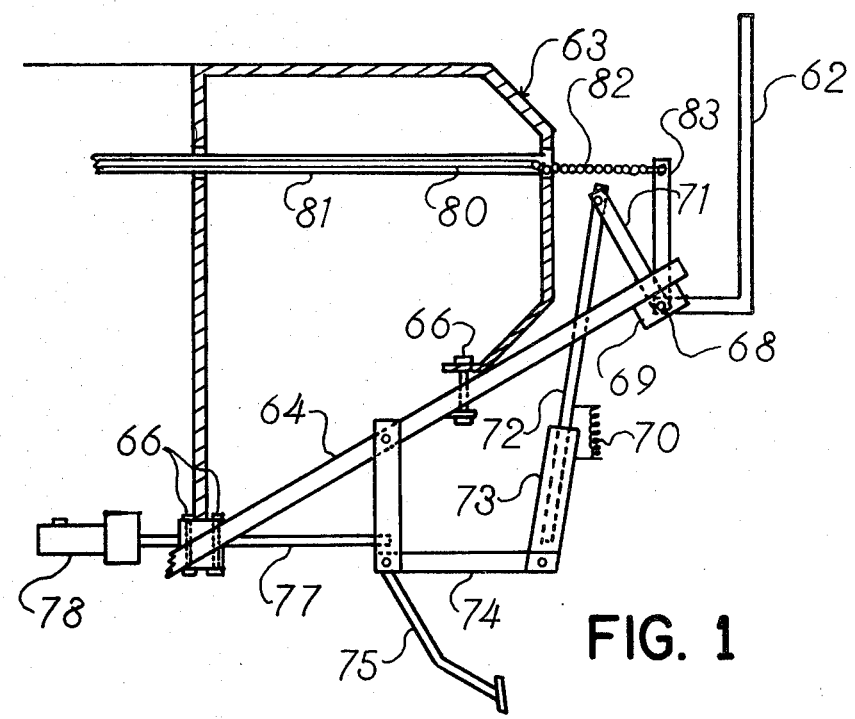
FIG. 1 is a side elevation of a novel single lever operating control assembly of the vehicle of the invention.
Figure 2:
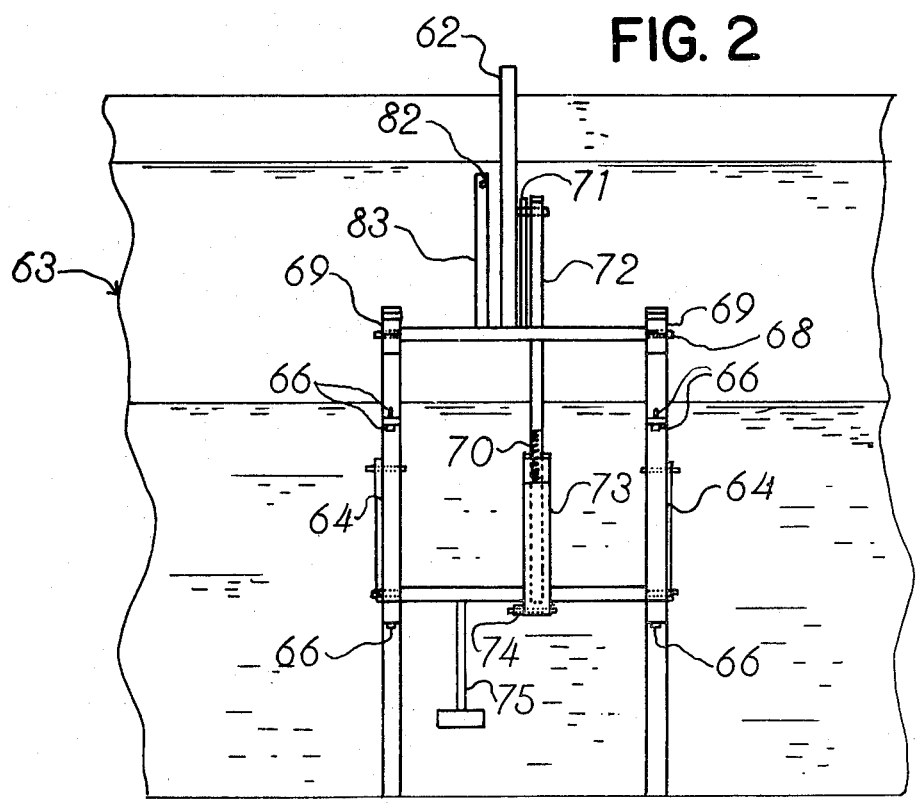
FIG. 2 is a right end view of the control assembly shown in FIG. 1.

The operating control for the vehicle of the invention is shown in FIGS. 1 and 2. A single lever 62 selectively activates the brakes or throttle through an assembly mounted under dash 63. Main supports 64 are secured under dash 63 and to the firewall with suitable bolts 66. Lever 62 is affixed to a rotatable shaft 68, the ends of which are carried by bearing supporting brackets 69 fastened to the outer ends of main supports 64. An arm 71 welded to shaft 68 is pivotally connected to a vertical push rod 72 which extends downwardly into sleeve 73. A spring 70 is connected between push rod 72 and sleeve 73. Sleeve 73 in turn is pivotally connected to link 74 which is attached to pivotally connected brake pedal 75 at a point adjacent to the connection of brake pedal 75 with primary brake push rod 77 extending from power brake booster 78. A throttle cable 80 within cable housing 81 extends from dash 63 and is operatively connected through a ball chain 82 to an arm 83 which extends upwardly from shaft 68 adjacent to rod 71.

In the use of the operating control described above, the driver pushes the lever 62 forward to brake the vehicle and pulls the lever torward him to accelerate the vehicle. When lever 62 is pushed forward, shaft 68 rotates in bearing supporting brackets 69 causing the end of the arm 71 to depress and moving push rod 72 downward into contact with the bottom of sleeve 73. Additional forward movement of lever 62 moves sleeve 73 downward and forces link 74 to apply pressure to brake pedal 75 which is pivotally hung from supports 64. Pressure on brake pedal 75 forces primary push rod 77 forward to activate power brake booster 78.

To release the brake, the driver releases forward pressure on lever 62. If he wishes to move the vehicle, he pulls the lever 62 toward his body. This movement rotates shaft 68 in bearing supporting brackets 69 and raises the end of arm 71 and push rod 72 connected thereto is partially withdrawn from sleeve 73. As shaft 68 is rotated by lever 62, arm 83 pulls ball chain 82 which draws throttle cable 80 from cable housing 81.

When the driver wishes to slow or stop the vehicle, he pushes the lever 62 forward causing arms 71 and 83 to move forward releasing the throttle cable 80 and causing push rod 72 connected thereto to move downward. After push rod 72 has bottomed in sleeve 73, further forward pressure on lever 62 will result in movement of sleeve 73, link 74, and primary push rod 77 to activate power brake booster 78.

By selecting the proper lengths and angles for the various components of the operating control, a mechanical advantage can be achieved which will permit fingertip operation of lever 62 and still enable a severely handicapped person to have complete control of the braking and accelerating functions of the vehicle.

In addition, the novel vehicle of the invention provides a new hand operated control system in which a single layer controls both the brake and the throttle functions. Furthermore, the unique system permits an individual with only limited hand and/or arm dexterity to safely control a vehicle. Moreover, the novel control system enables a driver to brake and accelerate a vehicle without removing his hand from the single lever.

It will be apparent that various modifications may be made in the novel vehicle and the door assembly, operating controls and restraint system thereof described in detail above and shown in the drawings. For example, the upper glass section of the door assembly may be replaced with a metal or plastic section. Also, the control lever may be of a different configuration to permit use by a person with a particular hand and/or arm handicap. Further, the padded chest portion of the driver restraint system may be a different design to accommodate individuals with special physical problems. Therefore, the invention is to be limited only by the following claims.

What is claimed is:

1. A dual function hand operated vehicle control system including a lever affixed to a rotatable shaft, two spaced arms extending generally upwardly from said shaft forward of said lever, one of said arms being pivotally connected to a substantially vertical push rod which extends downwardly into a substantially vertical sleeve, said push rod being capable of effecting movement of said sleeve, the lower end of said sleeve being operatively connected to a power brake booster through pivotally connecting linkage, said second arm being operatively connected to a throttle cable through flexible connecting means.

2. A hand operated vehicle control system according to claim 1 wherein said push rod is connected to said sleeve by biasing means.

3. A hand operated vehicle control system according to claim 1 wherein said push rod contacts the bottom of said sleeve when said lever is pushed forward.

4. A hand operated vehicle control system according to claim 1 wherein said flexible means connecting said second arm with said throttle cable is a ball chain.

* * * * *